UNITED STATES PATENT OFFICE.

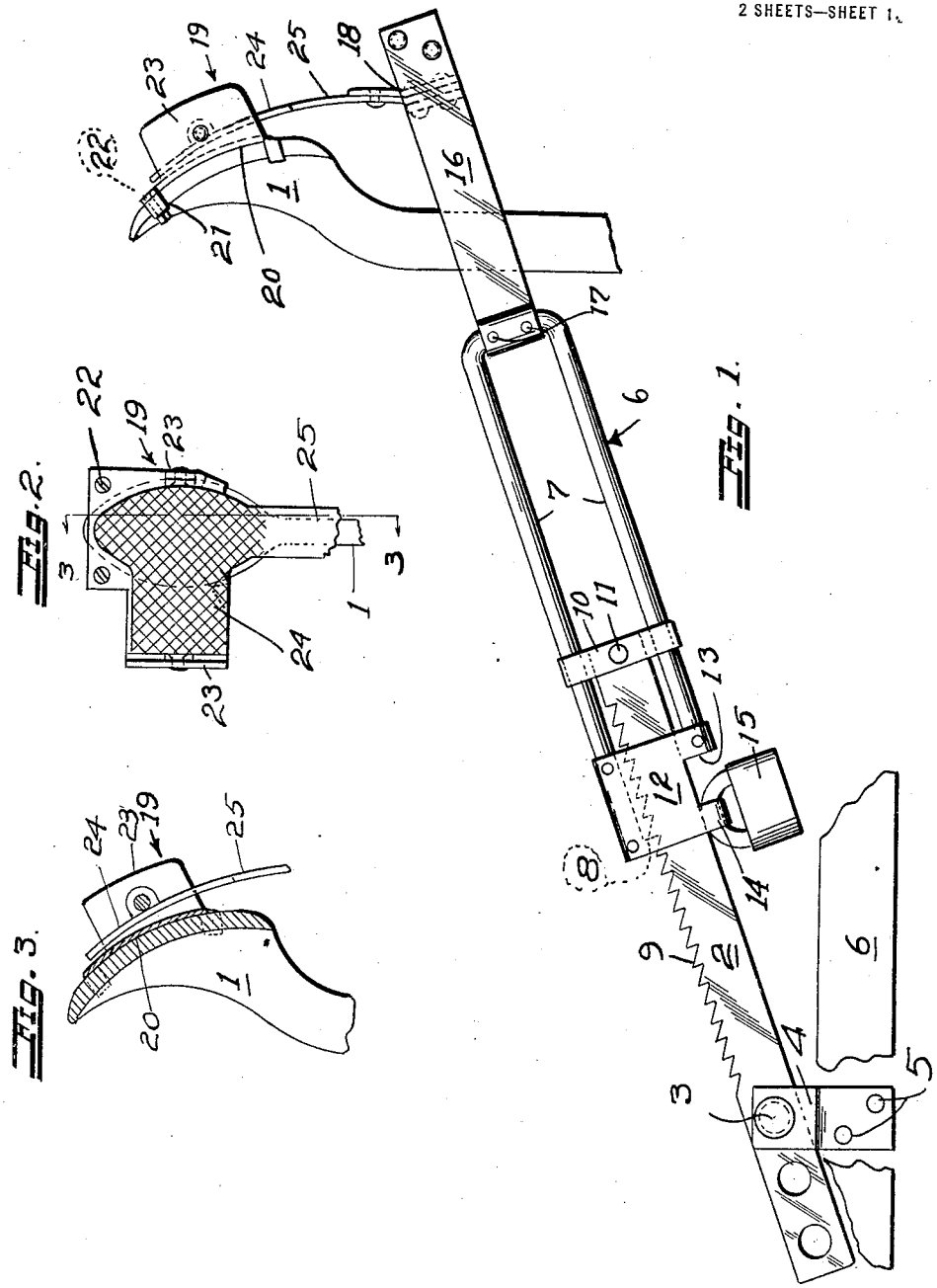

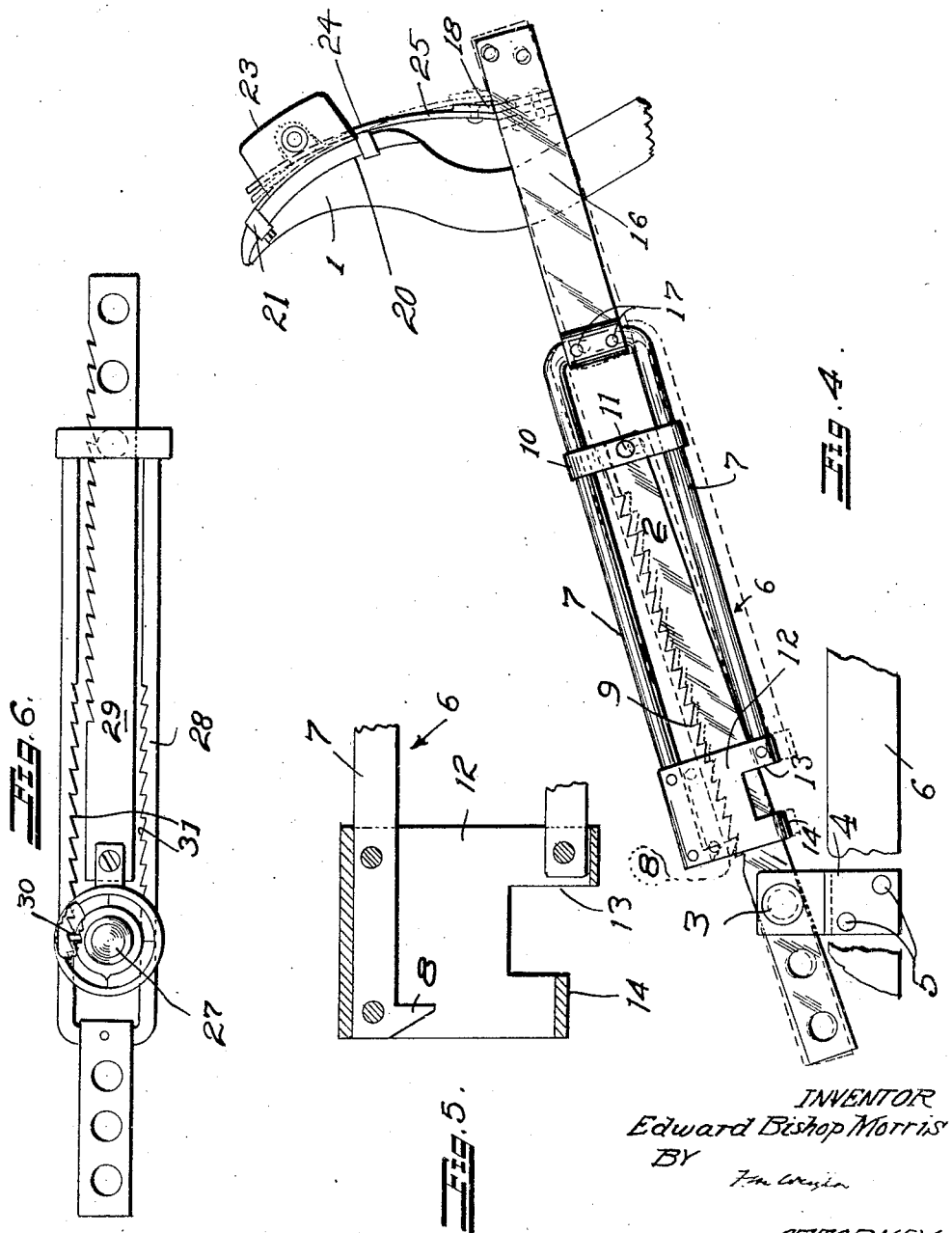

EDWARD BISHOP MORRIS, OF VALLEJO, CALIFORNIA.

COMBINATION GEAR-CONTROL AND AUTO LOCK.

1,389,966.  Specification of Letters Patent.  Patented Sept. 6, 1921.

Application filed July 12, 1919. Serial No. 310,517.

*To all whom it may concern:*

Be it known that I, EDWARD BISHOP MORRIS, residing at Vallejo, in the county of Solano and State of California, have invented new and useful Improvements in Combination Gear-Control and Auto Locks, of which the following is a specification.

My invention relates to improvements in automobiles of that type in which the operation of the change speed mechanism or transmission is controlled by a pedal.

In automobiles of this type to operate in "low" or first speed the operator must hold the pedal in a certain position against the action of a stiff spring. In negotiating mountain grades or long hills and at other times when it is necessary to operate in "low", it is an exceedingly tiresome operation to hold the pedal in "low" or first speed position. Accordingly I have provided a device by means of which the pedal may be locked in a quickly releasable manner, in "low" position and I therefore obviate the above noted necessity of holding the pedal in "low" position with the foot and remove one of the chief objections to cars of this type.

An object of the invention is to provide a device of the character described which will serve as protection against theft of the automobile in that it may be locked in such position that the gear mechanism will be locked in "neutral" position and will be prevented from being shifted into its operating positions by an unauthorized person.

Another object of the invention is to provide a device of the character described which may be easily attached to an automobile and associated with the control mechanism for the gears without necessitating any change in the construction of the automobile, and which is relatively simple as to construction, inexpensive and reliable in operation.

The invention possesses other advantages and features, some of which, with the foregoing will be set forth at length in the following description where I shall outline in full, that form of the invention which I have selected for illustration in the drawings accompanying and forming a part of the present specification. In said drawings I have shown one form of the construction of my invention but it is to be understood that I do not limit myself to such form, since the invention as expressed in the claims may be embodied in a plurality of forms.

Referring to the drawings:—

Figure 1 is a side elevation of my invention showing it attached at the gear control pedal of an automobile and as it would appear when the pedal is locked in "neutral" position against operation.

Fig. 2 is a front elevation of the operating means on the pedal.

Fig. 3 is a vertical sectional view taken on line 3—3 of Fig. 2.

Fig. 4 is a side elevation of the device showing it as it would appear when the pedal is locked in "low" position, in dotted lines and as when unlocked in full lines.

Fig. 5 is a detail fragmentary sectional view taken through one end of the locking member.

Fig. 6 is a side elevation of a modified form of the invention.

1 designates the pedal for controlling the gear mechanism or transmission, not shown, said pedal having a tendency to be pulled in the direction of the arrow shown in Fig. 1, by a spring, not shown. Since the construction and operation of automobiles of this type is well known it is thought it is not necessary to illustrate the workings thereof in detail.

My invention comprises a rack bar 2, which is pivoted at one end as at 3 to a bracket 4. This bracket may be secured in any suitable manner as at 5 to the frame 6, of the automobile in front of the pedal 1. A U-shaped locking member or open link 6 is slidably and rockingly connected with the rack bar 2. This link comprises parallel arm portions 7 which lie on the upper and lower sides of the rack and the upper arm 7 has a tooth 8 on its free end for engagement with the teeth 9 of the rack bar. A loop guide member 10 is mounted on the adjacent end of the rack bar 2, said rack extending into the loop and being pivoted thereto centrally of the ends of the loop, as at 11. The arm portions 7 extend through the loop and engage the end portions thereof. The arms 7 are of such distance apart that when parallel to the rack bar the tooth 8 is free from engagement with the teeth 9. In this position the link may slide backward and forward freely upon the rack bar. By rocking the link in the guide 10 so that the closed or upper end of the link moves in an upward direction the tooth 8 on the link will engage in the teeth 9 and lock the link against movement. The free ends of the arms 7 are joined by a loop 12 of strap metal so that the loop will act as a guide for and receive the rack 2. This loop 12 extends beyond the free ends of the link and at its lower corner is cut away as at 13. A second loop member 14 is secured to the loop 12 and its lower end extends into the space defined by the cut away portion of the loop 12 below the rack bar. This loop 14 is adapted to receive a padlock 15 so that a part of the lock will lie between the end of the loop and the bar 2, and prevent the rocking of the link 6 when locked upon the rack bar. A connecting member 16 is secured at one end as at 17 to the closed end of the link 6 and is fixed as at 18 at its other end to the operating means 19 which means is mounted upon the pedal 1.

The means 19 for operating the locking member or link 6 comprises a base plate 20 having clamps on the under side thereof. The clamps comprise angular members 21 which extend under the pedal and engage the under face of the base plate 20. Bolts 22 are inserted through the plate 20 and angular members 21. Nuts are turned on the bolts and provide for tightening the angular members and clamping the plate 20 upon the pedal. Pivotally mounted between opposed ears 23 on the base plate 20 is a treadle operating member 24 provided with an angular extension 25 which depends therefrom. The connecting member 16 is fixed to this extension as at 18, as previously described.

The pivot for the treadle operating member 24 is located intermediate of the upper and lower ends of said member and the member is relatively long so that, the operator may by pressing thereon above the pivot depress the upper end of the member and by pressing on the lower half below the pivot depress said lower half. These operations will lock and unlock the link or locking member 6 as will be now described.

By pressing the operating treadle 24 forwardly and so as not to press above the pivot thereof the arm 7 carrying the tooth 8 is held above the rack bar 2 and the pedal can be operated in the ordinary manner. When the pedal is pushed forward to its full extent it is in "low" gear and ordinarily must be held by the operation in such position to maintain the "low" gear operation. To lock the pedal in low gear position, the operator presses on the member 24 above the pivot thereof and this causes the arm 7 with the tooth 8 to be rocked and moved into contact with the teeth 9 of the rack with the result that the pedal is locked in "low" position. To release the locking member 6, the operator presses the member 24 below the pivot therefor and this will rock the member 6 so that it will raise the tooth 8 out of engagement with the rack bar. It will thus be seen that the pedal may be readily and quickly released.

To lock the pedal against operation so that it cannot be moved out of "neutral" into either of its working positions to provide a safe-guard against theft of the automobile, the padlock 15 is inserted through the loop 14 between the loop and rack bar, after the pedal has been locked by the member 6 and rack bar in neutral position. The hasp of the lock is then between the bar and link so that rocking of the link member 7 to cause its release from the rack bar 2 is prevented. To unlock the device the padlock is removed. As the padlock will be concealed as will the rest of the locking mechanism, under the hood of the engine, the lock will not be likely to be detected and will baffle the would be thief so as to thwart his attempt to steal the car.

In Fig. 6 the modified form of the invention provides for a permutation or combination locking device 27 which slidably receives the link 28 and is attached to the rack bar 29. By locking this lock, detents or bolts 30 will project therefrom and engage in notches 31 in the opposed faces of the sides of the link 28. The operation of this form of the invention is the same as the other form and will be apparent from the foregoing.

It will thus be seen that I have provided a simple, efficacious device for holding the gear pedal in "low" and "neutral" positions without requiring the operator to hold his foot upon the pedal to maintain such positions. This I provide for in a way which will not interfere with the ordinary and a safe operation of the "pedal."

I claim:—

1. In a device of the character disclosed, the combination with the gear control pedal of an automobile, of a rack bar fixed to the automobile, a locking member slidably connected with the rack bar, means for pivotally connecting said locking member with said rack bar, a tooth on the member adapted to engage in the teeth on the rack bar when the locking member is rocked on its pivot and means mounted on the pedal and connected with the locking member for rocking said member to lock and release it.

2. In a device of the character disclosed, the combination with the gear control pedal of an automobile, of a rack bar fixed to the automobile, a locking member slidably connected with the rack bar, means for pivotally connecting said locking member with said rack bar, a tooth on the member adapted to engage in the teeth on the rack bar when the locking member is rocked on its pivot, means mounted on the pedal and connected with the locking member for rocking said member to lock and release it and means for locking the locking member with the tooth thereon engaged in the rack bar whereby the operating means on the pedal is held against operation.

3. In a device of the character disclosed the combination with the gear operating pedal of an automobile of a rack bar pivoted to the automobile, a locking member slidably connected with the rack bar, means for pivotally connecting said locking member with said rack bar, a tooth on said member adapted to be moved into and out of engagement with the rack bar when said member is rocked on its pivot, a treadle plate pivoted intermediate of its ends on said pedal and means of rigid connection between said plate and the locking member.

4. In a device of the character disclosed the combination with the gear operating pedal of an automobile of a stationary locking member secured to the automobile, a locking member slidably connected with the first named locking member, means for pivotally connecting the last-named locking member with first named locking member, said last named locking member being adapted when rocked on its pivot to lock with the first locking member, and means mounted on the pedal for rocking said last named member and with which said member is connected.

5. In a device of the character disclosed the combination with the gear operating pedal of an automobile of a stationary locking member secured to the automobile, a locking member slidably connected with the first named locking member, means for pivotally connecting the last named locking member with first named locking member, said last named locking member being adapted when rocked on its pivot to lock with the first locking member, means mounted on the pedal for rocking said last named member and with which said member is connected, and means for detachably mounting the rocking means on the pedal.

6. In a device of the character disclosed the combination with the gear operating pedal of an automobile of a rack bar pivoted at one end to the automobile, a guide member pivoted on the rack bar, a locking member slidably mounted in the guide member and adapted to engage the rack bar when the guide rocks on its pivot, a treadle plate pivoted on the pedal, and a rigid connection between the plate and locking member.

7. In a device of the character disclosed the combination with the gear operating pedal of an automobile of a rack bar pivoted at one end to the automobile, a guide member pivoted on the rack bar, a locking member slidably mounted in the guide member and adapted to engage the rack bar when the guide rocks on its pivot, a treadle plate pivoted on the pedal, a rigid connection between the plate and locking member and a lock for locking the locking member and rack bar against relative movement.

EDWARD BISHOP MORRIS.

Witnesses:
JAMES HARTWELL DUNCAN,
JOHN JAMES HAECKL.